United States Patent Office 3,542,559
Patented Nov. 24, 1970

3,542,559
PREPARATION OF HIGH-PROTEIN
PRODUCTS FROM SAFFLOWER
Alan E. Goodban, Walnut Creek, and George O. Kohler,
El Cerrito, Calif., assignors to the United States of
America as represented by the Secretary of Agriculture
No Drawing. Filed Dec. 4, 1967, Ser. No. 687,500
Int. Cl. A23j 1/14; A23k 1/00; C11b 1/10
U.S. Cl. 99—2                                14 Claims

ABSTRACT OF THE DISCLOSURE

Safflower seeds or residues from the extraction of oil therefrom are treated to isolate compositions of enhanced protein/fiber ratio. Typically, the safflower material is milled in hexane, the liquid phase is separated from the milled product, and finely-divided material suspended in the liquid phase is recovered—usually, by centrifugation or filtration—yielding a high protein composition useful in animal feeds. Oil may be recovered from the liquid phase to integrate production of oil with production of the proteinous composition.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates, in general, to the processing of safflower and has as its primary object the provision of novel processes for preparing high-protein fractions useful as seeds and feeds. Further objects and advantages of the invention will be evident from the following description wherein parts and percentages are by weight unless otherwise specified.

Safflower seeds are well known as a valuable source of oil and are primarily grown for such purpose. Conventionally, oil is extracted from safflower seeds in the following manner:

The seeds are ground or flaked, cooked, conditioned, and pressed in a conventional screw press, yielding the major portion of the oil.

The residual material—the press cake—is then extracted with hexane to recover additional oil still contained therein. Since the aim is to obtain a clear oil, it is conventional to pass hexane through a static bed of the press cake. For example, the press cake is put into baskets made of perforated metal and these baskets are then slowly conveyed through a series of tanks wherein hexane is caused to flow or percolate through the individual baskets. In each basket the mass of press cake is held static so that any fines are entrapped in the mass and do not leave the system with the extract. The extract from this process is treated to evaporate hexane yielding another portion of oil. Throughout the process to this point, the production of fines is considered undesirable and is therefore minimized.

The extracted press cake, generally termed "meal" in the industry, is also dried, i.e., treated to vaporize hexane. The resulting meal has some value as a feed, particularly because it contains about 20% protein. However, because of its high fiber content—generally 35%—it is only suitable for ruminants. It is of little value in poultry feeding, for example.

The industry is aware of this situation and various procedures have been advocated for up-grading safflower meal. One of these is described as follows: The meal is subjected to dry grinding and the ground material is then sieved. The finer material is collected as the up-graded product—the one containing an increased proportion of protein and a decreased proportion of fiber. Generally, the best products obtainable by this procedure contain about 40-45% protein and 15-20% fiber.

A particular object of the invention is the provision of procedures which yield products containing a higher proportion of protein and a lesser proportion of fiber than those obtainable by known practical methods. Moreover, the invention encompasses procedures for integrating the recovery of oil with the production of such high-protein fractions.

One phase of the invention concerns the application of wet milling to safflower seed materials. Another phase of the invention concerns the application of wet separation to such materials. At this point it is apropos to note that the term "wet" used herein has no reference to water, but refers to the presence of an organic solvent—typically, hexane. We have found that each of the steps in question (wet milling and wet separation) provides important advantages over conventional (dry) operations, and it is within the broad ambit of the invention to utilize either one of these novel steps or both of them. A particular advantage of our wet-milling step is that it exerts a differential size reduction—the kernel material (which is high in protein content) is reduced to smaller particle size than the hull material (largely fiber). This differential size reduction greatly facilitates separation of the two fractions, that is, the proteinous material and the fibrous material. A particular advantage of our wet-separation technique is that the presence of hexane or other solvent in contact with the proteinous and fibrous fractions creates a difference in apparent density between these fractions so that one can be readily isolated from the other. Moreover, by conducting either or both steps in the wet state, we are enabled to integrate oil recovery from the safflower material with recovery of high-protein fractions.

The processes of the invention may be applied to safflower seeds themselves or to any of the materials derived therefrom in oil-removal systems. Thus for example, the invention may be applied to press cake, meal, or other residues from oil expressing and/or extracting procedures. Moreover, the invention may be applied to meals which have been up-graded by conventional procedures. The expression "safflower seed material" used herein is understood to include not only safflower seeds but also materials derived therefrom which contain protein and fiber.

Since hexane is effective, readily available in oil-extraction plants, and relatively inexpensive, it is generally preferred for use as the solvent in both the wet-milling and wet-separation steps. However, it is by no means the only solvent which can be used. Thus, one may employ any liquid hydrocarbon, hydrocarbon mixture, chlorinated hydrocarbon, fluorinated hydrocarbon, or other volatile fat solvent which has a density less than 1.2, preferably less than 1. Also suitable are oxygenated solvents such as methanol, ethanol, isopropanol, acetone, and the like. The use of these (oxygenated) solvents provides special benefits as explained below in section IV.

Various embodiments of the invention which utilize the aforesaid principles are next described in detail.

EMBODIMENT I—WET MILLING AND WET SEPARATION (A) Wet milling: Safflower seed material—e.g., seeds, press cake, or meal—is milled in the presence of hexane or other solvent, using conventional comminuting apparatus such as a hammermill, press rolls, or the like.

The milling is conducted in the presence of an amount of solvent sufficient to at least wet the safflower material. In general, at least 0.5 part of solvent is used per part of safflower material, and, where the next step (separation) is to be conducted in the wet state, one may use an excess of the solvent to provide a milled mixture which is directly ready for said next operation. The use of an excess of solvent during the milling step is also desirable where one intends to extract and recover oil from the starting material.

As noted above, a primary advantage of our wet-milling step is that it causes a differential size reduction—the protein-rich material being reduced to smaller sized particles than the fibrous (hull) material. Additional advantages which are attained in wet-milling materials, such as meals or other residues from conventional oil-extraction procedures, are explained below:

In the meal, the germ (protein) material is tightly cemented to the hull particles. This effect is established in the step where the cracked seeds are subjected to pressure to express oil. Also, this cementing action may be aggravated when the meal is dried, that is, residual hexane is evaporated therefrom. During this drying step it is customary to introduce steam to blow hexane vapor out of the material and some of this steam condenses to water and makes the protein material especially sticky so that it clings tightly to the hull particles. The net result is that dry milling does not yield an effective segregation effect—a large proportion of the particles of hull material have protein material clinging tightly thereto. This, of course, militates against efficient fractionation when the dry-milled product is screened. On the other hand, when the milling is done wet—as in the process of the invention—the protein deposits are softened and dislodged from the hull fragments. Thus, a good segregation of protein material from fibrous material is attained. Also, by this dislodgment effect the milling apparatus is enabled to reduce the particles of protein material (softened by the hexane) to smaller dimensions than the hard particles of hull. This differential size-reduction effect greatly assists in attaining efficient fractionation.

(B) Wet separation: An illustrative example of this step involves a flotation or density fractionation to segregate the protein-rich and fiber-rich fractions contained in the mixture resulting from the wet milling. The mixture at this point should contain an excess of the solvent—enough, for example, to provide at least 2 parts of solvent per part of safflower material. A larger proportion of solvent can of course be used, and may be especially desirable where the overall purpose includes extraction and recovery of oil from the starting material. In cases where the wet milling was carried out in the presence of a lesser proportion of hexane, it is obvious that more of this solvent would be added at the start of the separation step, whereas if the milling were carried out with an excess of hexane, the milled mixture would be directly ready for the separation procedure. In any event, the milled mixture, with or without addition of solvent as may be indicated, is allowed to stand for a brief period of time—for example, 10 to 60 seconds—whereby the dense hull material will quickly settle out. The protein material—being less dense than the hulls and also being in fine particle size—remains suspended in the solvent. Accordingly, the solvent phase is decanted or otherwise removed, carrying with it the protein material. By application of centrifugation or filtration to the liquid this protein material is isolated. It is then dried to remove residual solvent and is ready for use or sale. The fractionation may be re-applied to the hull material to separate protein material which was not removed the first time.

In typical applications of the wet milling-wet separation procedure described above we have obtained products containing 50 to 65% protein and 2 to 8% fiber. Because of this high protein/fiber ratio the products are highly suitable for feeding poultry and other non-ruminants. Indeed, the products—by application of a purification technique described below—can be rendered useful for human use, e.g., for supplementing rice, wheat, and other low-protein foods.

An important facet of the wet-separation step of the invention is that contact of the solvent with the safflower material creates an apparent density difference between the protein and fiber components of the material. Thus, we have observed that the protein and fiber components have about the same true density—on the order of 1.4. However, when the solvent is added, the fibrous components retain their high density whereas the protein components assume a lower density, presumably by penetration of the solvent into the pores and interstices of the germ (protein) material. At any rate, the net result from a practical standpoint is that the fibrous material will sink rapidly while the protein material tends to remain suspended in the solvent. Moreover, as noted hereinabove, the finely-divided condition of the protein material also contributes to the fact that it remains suspended in the liquid.

In the above description of the wet-separation procedure, we have provided an example wherein the liquid phase carrying suspended particles is removed from the settled hull material and the liquid phase subjected to filtration or centrifugation to isolate the proteinous material. It is, of course, obvious that the separation need not entail exactly these operations. One can apply other isolation procedures which will take advantage of the difference in particle size between the protein and fiber fractions and the difference in density (in the solvent-containing mixture) between these two fractions. Thus, for example, the entire mixture can be passed through a screen of such size as to retain the coarser (fiber) particles but permit passage of the liquid and the finer (protein) particles. The liquid which passes through the screen is then subjected to filtration or centrifugation to isolate the suspended protein material. For continuous operation one could employ the following plan. A tank is provided having an overflow outlet near the top and another outlet adjacent the bottom. Safflower seed material is ground with added hexane and the wet-milled material is mixed with additional hexane and the mixture continuously fed into the tank. Within the tank the desired separation occurs and liquid with suspended protein material is withdrawn continuously through the top overflow outlet while the fibrous material which sinks to the bottom is continuously withdrawn through the bottom outlet. The liquid which passes through the top overflow outlet is treated by filtration or centrifugation to collect the suspended protein material.

Although the invention is primarily concerned with increasing the protein/fiber ratio of safflower seed materials, it can yield additional benefits—for example, it can be employed for recovery of oil from the starting material. Where the starting material contains oil, this oil will be dissolved in the liquid phase recovered in the wet-separation step. Thus, after isolation of suspended material from the liquid phase, the oil may be recovered from the clarified liquid phase by evaporation of the solvent.

EMBODIMENT II—WET MILLING,
DRY SEPARATION

In applying this modification of the invention, the starting material is subjected to wet milling as previously described. The solvent is then removed from the wet-milled material. Where the starting material is a material low in oil content (for example, a meal or similar residue from oil extraction) the solvent may be removed from the wet-milled material by evaporation. Where the starting material is whole seed, press cake, or other safflower material containing a substantial proportion of oil, it is desirable to remove the solvent from the wet-milled material in such a way that the solvent carries with it the oil extracted from the starting material. This can be done in conventional manner by decanting the liquid phase from the wet-milled mixture, or by applying filtration or the like. The separated liquid phase may be subjected to centrifugation to isolate any finely-divided protein material suspended in this phase. The solid residue of the wet-milled mixture is heated, with or without application of vacuum, to remove any residual solvent.

In any event, the wet-milled material now free from solvent is then sieved or screened. A series of graded screens may be used and it will be observed that the particles of smaller size are higher in protein content than the particles of larger size. The smaller particles are mostly germ material while the larger particles are mostly hull material.

EMBODIMENT III—DRY MILLING, WET SEPARATION

In applying this modification of the invention, the starting material is subjected to conventional (dry) milling. Where the material is an oil-extracted meal, press cake, or other safflower residue relatively low in oil content the milling is preferably done by hammermilling or other techniques which applies attrition. Where the starting material is whole seeds the milling is preferably applied by a crushing action, as by passing the material through press rolls. The milled material is then subjected to the wet separation procedure described above in section I.

This embodiment of the invention is particularly preferred where the starting material is whole safflower seeds or safflower press cake. Because of the oil contained in these materials, especially good results are attained in the milling operation even though no solvent is added. The point is that the oil naturally present in the material acts as a plasticizer whereby the desired preferential softening of the germ (high protein material) is attained with the net result that at least part of the benefits of wet milling are attained.

As an example of this embodiment of the invention, a procedure which integrates oil production with production of a high-protein composition is next described.

Whole safflower seeds—at ambient temperature or heated, for example, to about 100–150° F.—are crushed in a roll-type press. In this operation the soft kernels are reduced to an oily mush whereas the brittle hulls are split into fragments or pieces which generally are as long as the length of the original seeds. The crushed material is then mixed with an excess of a conventional fat solvent such as hexane, and the liquid extract is separated from the system while the liquid still contains the suspended matter (high-protein germ components) derived from the mush. Retention of this suspended matter in the extract can be enhanced by rapidly removing the extract from the extraction zone, by applying agitation in the extraction zone, and, in general, by avoiding the static conditions previously thought to be desirable in conventional oil extraction procedures. The extract leaving the extraction zone is then centrifuged or filtered to recover the suspended material (the high-protein composition) and the clarified extract is de-solventized to recover the oil. The residue of the extraction (mostly hulls) may be re-extracted with fresh solvent to recover oil still contained therein.

EMBODIMENT IV—DE-BITTERING

In the past, attempts have been made to use residues from the oil extraction of safflower as supplements in human feeding. These attempts have not met with success because the residues contain bitter principles and also principles which have a cathartic effect. We have found that these deleterious principles can be removed by extraction with an alcohol or acetone. Moreover, this extraction can be accomplished at the same time that the residue is upgraded as to protein content. In applying this embodiment of the invention, the safflower seed material is treated by any of the aforesaid procedures (I, II, or III), using an oxygenated solvent such as an alcohol or acetone as the solvent. A typical practice of this phase of the invention is illustrated by the following:

The starting material—e.g., seeds, press cake, meal, or dry milled and sieved meal—is milled in the presence of an alcohol or acetone, as described above in Section I. The milled product is then wet separated (using an alcohol or acetone as the solvent) as described above in Section I. In this procedure the bitter and cathartic principles dissolve in the alcohol (or acetone) and are thus removed from the protein product.

The oxygenated solvent may be anhydrous or contain some water. Thus in general the solvent may contain 60 to 100% of oxygenated solvent (e.g., methanol, ethanol, propanol, isopropanol, or acetone) and 0 to 40% water. Usually, optimum removal of bitter principles is attained where the solvent contains about 25% water.

The procedure of the invention using an oxygenated solvent can be employed for integrating production of oil with production of purified protein product, since the oil is soluble in the oxygenated solvent, even where it contains water.

EXAMPLES

The invention is further demonstrated by the following illustrative examples.

EXAMPLE 1

The starting material for this run was the best commercially-available high-protein product, prepared by dry milling and sieving safflower meal. It contained 42.3% protein and 19.4% fiber.

Seventy grams of the commercial material and 400 ml. of hexane were placed in an Osterizer—a device equipped with a bowl and a rotating blade in the base of the bowl for comminuting and blending the contents thereof. The blade was rotated for 5 minutes, then the liquid was decanted and filtered. The material collected in the filter was removed and dried (it was designated Fraction $a$). Another batch of hexane (400 ml.) was added to the residual material in the Osterizer. The blade was operated for a few minutes and the liquid was decanted, filtered, and the material collected in the filter was dried (Fraction $b$).

The residual material remaining in the Osterizer was air dried and screened to produce various fractions:

$c$—through 150-mesh screen
$d$—retained on 150-mesh screen
$e$—retained on 80-mesh screen
$f$—retained on 60-mesh screen
$g$—retained on 40-mesh screen The results are tabulated below:

| Fraction: | Yield, percent | Protein content, percent | Fiber content, percent |
|---|---|---|---|
| $a$ | 10.1 | 56.0 | 6.2 |
| $b$ | 5.4 | 55.8 | 6.8 |
| $c$ | 11.4 | 55.9 | 7.0 |
| $d$ | 12.4 | 50.5 | 12.8 |
| $e$ | 10.7 | 49.7 | 13.6 |
| $f$ | 21.6 | 45.7 | 16.9 |
| $g$ | 28.4 | 29.7 | 37.5 |
| Original meal | | 42.3 | 19.4 |

It is evident from the above tabulation that at least Fractions $a$, $b$, $c$, and $d$ represented a distinct improvement in protein content over the original material. It is evident that various of the fractions may be composited to provide products of desired protein-fiber ratio. Typical, for example, is compositing of Fractions $a$, $b$, and $c$ to provide a product having a high protein content, and compositing Fractions $d$, $e$, and $f$ to provide a composition having a protein-fiber ratio somewhat improved over the original stock and still useful for the same purposes as the original material, for example, for cattle feeding. The data on compositing is given below:

| Composite | Yield, percent | Protein content, percent | Fiber content, percent |
|---|---|---|---|
| Fractions $a$, $b$, and $c$ | 26.9 | 55.9 | 6.7 |
| Fractions $d$, $e$, and $f$ | 44.7 | 47.8 | 15.6 |

EXAMPLE 2

Seventy grams of whole safflower seed and 500 ml. of hexane were placed in an Osterizer. The blade was operated for about 5 minutes, then the liquid was decanted and filtered. Removal of hexane from the filtered liquid yielded 26.6 grams of oil. The material collected in the filter was removed and dried (Fraction a). The residue in the bowl was dried (Fraction b). The data obtained is tabulated below:

| Fraction: | Yield, percent | Protein content, percent | Fiber content, percent |
|---|---|---|---|
| a | 17.3 | 52.0 | 7.6 |
| b | 42.0 | 8.0 | 54.3 |

EXAMPLE 3

The starting material for this run was the best commercially-available high-protein material, prepared by dry milling and sieving safflower meal. It contained 42.3% protein and 19.4% fiber.

Seventy grams of the meal and 400 ml. of 80% isopropanol were placed in an Osterizer. The blade was operated for 5 minutes, then the liquid was decanted and filtered. The material retained in the filter was washed with a fresh batch (400 ml.) of 80% isopropanol, then dried (Fraction a). The material remaining in the Osterizer was also washed with 400 ml. of 80% isopropanol and dried (Fraction b). The filtered isopropanol and the washings were combined and evaporated to yield 8.8 g. of a dark brown material of unknown composition.

The data on the composition of Fraction a and b is given below:

| | Yield, percent | Protein content, percent | Fiber content, percent |
|---|---|---|---|
| Fraction: | | | |
| a | 13.6 | 63.1 | 10.0 |
| b | 73.9 | 45.6 | 24.6 |
| Original meal | | 42.3 | 19.4 |

Taste tests conducted on Fractions a and b and the original meal demonstrated that both Fractions a and b were free from bitterness whereas the original meal was very bitter.

EXAMPLE 4

Four thousand pounds of safflower seed were processed in the following manner:

The whole seeds were heated to 140–150° F. and passed through a pair of smooth rolls. Contrary to conventional practice wherein clearance is set to barely crack the seeds, the rolls were adjusted to touch one another whereby the kernels were crushed to an oily mush, while the fibrous hull material remained in relatively large pieces.

The crushed material was then introduced into a trough provided with a screw whereby it was conveyed in a direction countercurrent to a flow of hexane. Various conditions of this countercurrent extraction were: Feed rate of the mush, 90–93 lbs./hr. Solvent rate, 81–85 gal./hr. Solvent temperature, 115–120° F. retention time in extractor, 17–20 min.

The meal leaving the extractor was drained and the hexane removed by evaporation at 240–260° F.

The extract leaving the countercurrent extractor contained finely-divided, suspended material. It was filtered to remove the suspended material. The material retained on the filter was recovered and dried (Fraction a, approximately 400 lbs.).

The filtered extract was de-solventized in a vacuum drier at 200° F., 22 in. of vacuum, yielding approximately 1500 lbs. of oil.

A sample of Fraction a was extracted with hexane to remove residual oil, then analyzed for protein and fiber. The results were (on a fat-free, moisture-free basis):

| | Percent |
|---|---|
| Protein | 65.0 |
| Fiber | 2.2 |

In addition, it was observed that this material was essentially white in color and of a flour-like nature so that it could be readily dispersed by pouring. Because of this factor—and, of course, its high protein content—it was eminently suitable for incorporation into poultry feeds.

A sample of the meal (residue from the countercurrent extraction) was dried and subjected to screening. It was observed that the fraction (436 lbs.) which passed through a 50-mesh screen contained 47.5% protein and 7.3% fiber. This or other of the fractions having a lower protein/fiber ratio could be upgraded by applying the procedure described above.

Having thus described the invention, what is claimed is:
1. A process which comprises—
   (a) milling a safflower seed material containing protein and fiber,
   (b) mixing the milled material with an excess of a volatile solvent for fats of the class consisting of liquid hydrocarbons, chlorinated hydrocarbons, fluorinated hydrocarbons, methanol, ethanol, isopropanol, and acetone having a density less than 1.2 to cause particles of proteinous material to be suspended in the solvent phase,
   (c) separating the mixture into two portions, one being the solvent phase containing suspended proteinous material, the other being a residue of fibrous material, and
   (d) collecting the suspended proteinous material from the solvent phase, said collected material having a higher protein/fiber ratio than the original starting material.
2. The process of claim 1 where in the starting material is whole seeds.
3. The process of claim 1 wherein the starting material is press cake.
4. The process of claim 1 wherein the starting material is meal.
5. The process of claim 1 wherein the starting material is a refined meal.
6. The process of claim 1 wherein the milling is in the presence of a solvent having a density less than 1.2.
7. The process of claim 1 wherein the milling is in the presence of hexane.
8. The process of claim 1 wherein the milling is in the presence of aqueous isopropanol.
9. A process which comprises—
   (a) milling a safflower seed material containing protein and fiber in the presence of a volatile solvent for fats of the class consisting of liquid hydrocarbons, chlorinated hydrocarbons, fluorinated hydrocarbons, methanol, ethanol, isopropanol, and acetone having a density less than 1.2 to attain a differential size reduction of proteinous components to smaller particles than the fibrous components, and to cause particles of proteinous material to be suspended in the solvent phase,
   (b) separating the milled mixture into two portions, one being the solvent phase containing suspended proteinous material, the other being a residue of fibrous material, and
   (c) collecting the suspended proteinous material from the solvent phase, said collected material having a higher protein/fiber ratio than the original starting material.
10. The process of claim 9 wherein the starting material is whole seeds.
11. The process of claim 9 wherein the starting material is press cake.

12. The process of claim 9 wherein the starting material is meal.

13. The process of claim 9 wherein the starting material is a refined meal.

14. An integrated process for producing oil and a high-protein product from safflower seeds which comprises—
   (a) crushing safflower seeds to break the hulls into pieces and to reduce the kernels to an oily mush,
   (b) contacting the crushed material with an excess of volatile for fats of the class consisting of liquid hydrocarbons, chlorinated hydrocarbons, fluorinated hydrocarbons, methanol, ethanol, isopropanol, and acetone solvent having a density less than 1.2, under conditions which maintain finely-divided proteinous material in suspension in the liquid phase of the system,
   (c) separating the resulting system into two portions, one being the liquid phase containing suspended finely-divided proteinous material, the other being a residue of fibrous material,
   (d) isolating the suspended material from said liquid phase, the isolated material being a high-protein product, and
   (e) de-solventizing the residual liquid phase to recover the oil therefrom.

References Cited

UNITED STATES PATENTS

| 3,119,805 | 1/1964 | Krueger et al. | 260—123.5 |
| 2,653,957 | 9/1953 | Westergaard | 260—412.4 |
| 2,714,551 | 8/1955 | Pascal | 260—412.4 |
| 2,820,047 | 1/1958 | King | 260—412.4 |
| 3,271,160 | 9/1966 | Kopas et al. | 99—2 |

FOREIGN PATENTS

| 709,350 | 5/1965 | Canada. |

NORMAN YUDKOFF, Primary Examiner

C. P. RIBANDO, Assistant Examiner

U.S. Cl. X.R.

99—14, 17; 260—123.5, 412.4